United States Patent [19]

Cihiwsky et al.

[11] Patent Number: 4,994,986

[45] Date of Patent: Feb. 19, 1991

[54] ONLINE PERFORMANCE MONITORING AND FAULT DIAGNOSIS TECHNIQUE FOR DIRECT CURRENT MOTORS AS USED IN PRINTER MECHANISMS

[75] Inventors: Philip K. Cihiwsky, Binghamton; Andrew C. Jaw, Vestal, both of N.Y.

[73] Assignee: International Business Machines Corporation, Armonk, N.Y.

[21] Appl. No.: 303,715

[22] Filed: Jan. 27, 1989

[51] Int. Cl.[5] .......................................... G06K 15/00
[52] U.S. Cl. ............................ 364/519; 324/158 MG
[58] Field of Search ....................... 364/518, 519, 520; 346/154; 318/563, 565, 638; 361/23; 324/158 MG; 355/206, 203; 271/256

[56] References Cited

U.S. PATENT DOCUMENTS 4,839,698  6/1989  Inuzuka et al. ..................... 355/206

Primary Examiner—Arthur G. Evans
Attorney, Agent, or Firm—Douglas M. Clarkson

[57] ABSTRACT

A technique that performs both real time and online monitoring and fault diagnosis during the operation of mechanical equipment with at least one direct current motor. The method described includes the steps of selecting conditions of operation that correspond to acceptable equipment functioning, and monitoring these conditions continuously during the operation of the equipment. When a fault develops, the monitoring routine initiates a diagnosis subroutine which identifies the component causing the fault and establishes an error message to indicate the faulty component, prior to the initiation of equipment shutdown procedures.

10 Claims, 8 Drawing Sheets

ONLINE PERFORMANCE MONITORING AND FAULT DIAGNOSIS TECHNIQUE FOR DIRECT CURRENT MOTORS AS USED IN PRINTER MECHANISMS

BACKGROUND OF THE INVENTION

1. Field of the Invention

The present invention, generally, relates to motor control systems and, more particularly, to a technique for effectively functioning as an online monitor of the performance of a direct current motor and for performing an online diagnosis of any fault detected before participating in a shutdown procedure.

2. Description of the Prior Art

By carefully studying the types of the failures that occur in a direct current motor driven mechanism, particularly as used in a printer for a computer system, it is possible to develop a list of those operations that should be monitored. The monitoring of such operations can reveal conditions or problems that lead to failures, and past efforts have all caused system shutdown before such failures occur.

Clearly, a system shutdown is preferable, when compared with a system failure. However, it has been found that a system shutdown can cause a problem in diagnosing the cause and, therefore, in providing the necessary preventive maintenance, because all too often it is an input data error that caused the shutdown and not a fault with the system. Therefore, what is needed is a way to diagnose the situation before the system shutdown procedure is initiated.

A U.S. Pat. No. 4,733,343 to Yoneda et al. describes a trouble identification scheme in connection with a numerical control machine, so that the machine may be stopped with a controlled "slow-down". Once stopped, however, repair of the trouble is not provided for.

In a Federico et al. U.S. Pat. No. 4,514,846 that issued in 1985, there is described a way of isolating the detected fault to a particular control board for later study and, hopefully, diagnosis of the cause. These inventors recognize that it is difficult to diagnose the cause of a fault at a later time, and so, there is provided this system of isolating a fault to a particular control board as a way of developing a history of where the faults are occurring.

There is a U.S. Pat. No. 4,179,732 that issued in 1979 to Khan et al. which also recognizes the clear advantages of having the diagnosis function performed, but it teaches that it must be done off-line. See column 11, lines 20-29. This teaching is a self diagnostic capability in printer microprocessor architecture that is done after the function is terminated and the printer system is driven off-line.

Of the U.S. patents assigned to the same Assignee as the present invention, U.S. Pat. No. 4,287,461; U.S. Pat. No. 4,452,136; U.S. Pat. No. 4,570,110; and U.S. Pat. No. 4,591,969 concern various aspects of motor control systems. However, of these prior patents, only the '136 patent teaches the use of a diagnostic capability, but that is an off-line arrangement. A printer control microprocessor is described as containing a diagnosis capability that is selected manually and executed off-line. See column 6, line 45 to column 7, line 5.

In U.S Pat. No. 4,730,164 to Daido et al., a diagnosis routine is described for detecting an abnormal condition in a stepping motor, but it must be done at initialization only, that is, before the control routine is applied. In this arrangement, there is no monitoring available during operation for a fault that can develop then.

As described previously above, what is needed is a technique for monitoring a system during operations and for diagnosing a fault before the system is shut down. It is to this end that the present invention is directed. Moreover, when the present invention is used as it will be described, it provides other advantages not available and not even contemplated by the prior arrangements.

OBJECTS AND SUMMARY OF THE INVENTION

Accordingly, it is a principal object of the present invention to provide a technique for both monitoring the performance online and diagnosing faults online for a direct current motor control system during the operations of a computer system printer with which such a motor is connected functionally.

It is also an object of the present invention to provide online performance monitoring and fault diagnosis for the stacker form-feed rollers that are powered by a direct current motor in an impact line printer during the operation of such a printer.

Another object of the invention is to provide a technique for the early detection of feed roller control faults in an impact line printer of a computer system, before a fault causes problems.

Briefly, the technique of the invention involves a microcode control system that performs both real time monitoring and online fault diagnosis for mechanical equipment having at least one component that is operated by a direct current electric motor. The technique includes the steps of selecting conditions of operation that correspond to acceptable equipment functioning, and monitoring these conditions during the operation of the equipment. When a fault develops, the monitoring routine initiates in real time a diagnosis subroutine which identifies the component causing the fault and establishes an error message to indicate the now identified component.

The above and other objects, features and advantages of the present invention will become more readily apparent from the following detailed description of the presently preferred embodiment as illustrated in the accompanying drawings.

DETAILED DESCRIPTION OF THE INVENTION

While the online performance monitoring and fault diagnosis technique of the present invention may be used in conjunction with a variety of mechanical equipment, it will be described, for the purpose of illustrating the invention, as it is connected operably with a direct current motor of a paper stacker device that is used on a impact line printer. In this environment, the invention functions to prevent problems that develop when errors arise in the control of the feed rollers in a powered form stacker device, such as form jamming, misfolding, tearing and the like.

Figure 1:
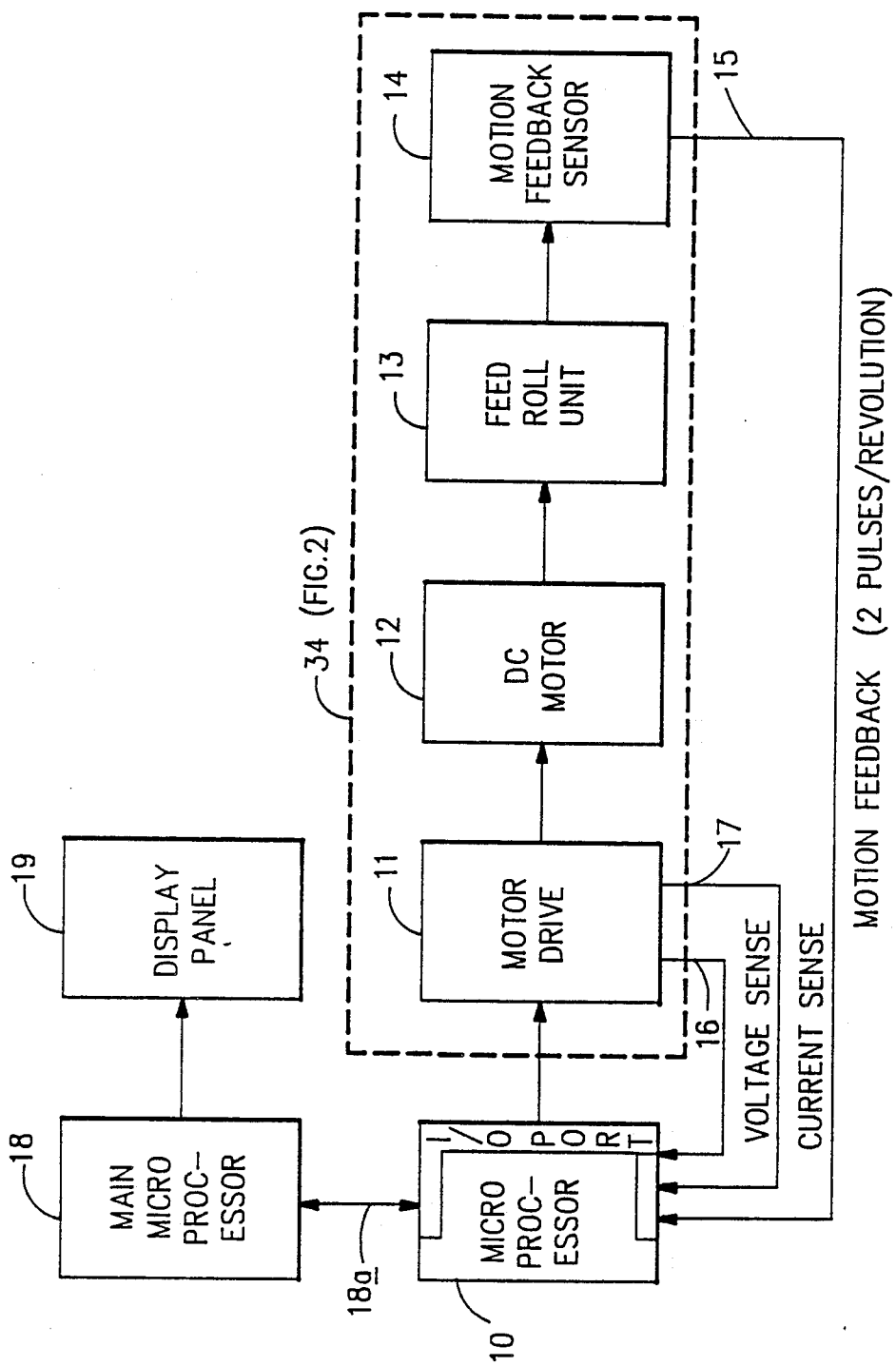
FIG. 1 is a block diagram illustrating the respective mechanical parts of one type of equipment controlled by a microprocessor, as an aid in describing the present invention.

In FIG. 1 of the drawings, the reference numeral 10 identifies a microprocessor connected to a microcode driven motor drive device 11 for operating a direct current motor 12. The microprocessor 10, found to be entirely satisfactory in performing as will be described in more detail hereinafter, is an INTEL 8051, available commercially from the Intel Corporation.

When cost becomes a significant factor, the direct current motor 12 is selected as a brush type device, but other types may be more suitable in other and different operating environments. Reliability can be increased by using suitable gears to connect the direct current motor 12 to the feed rollers 13 of a power form stacker used in conjunction with an impact line printer.

A motion sensor 14 is connected to detect motion in the feed rollers 13 and to transmit such information by a connection 15 back to the microprocessor 10. An important function of the feed rollers 13 is to move forms at a constant velocity from the impact line printer into a powered form stacker mechanism. One voltage sense connection 16 and one current sense connection 17 provide information to the microprocessor 10 concerning the operational state of the motor drive 11 and the direct current motor 12.

A main microprocessor 18 is connected to the microprocessor 10 to initiate control signals to it and to receive signals from the microprocessor 10 by means of a communications bus 18a, indicating information concerning the state of the system being monitored and any results of the fault diagnosis subroutine. A suitable display panel 19 provides a convenient way of showing such information, all of which will be described in more detail presently.

The mechanical portion of a computer line type printer environment in which the present invention is adapted to function will be described in detail presently. To describe a circuit control constructed in accordance with the principles of the invention, reference is made to FIG. 2 of the drawings.

Figure 2:
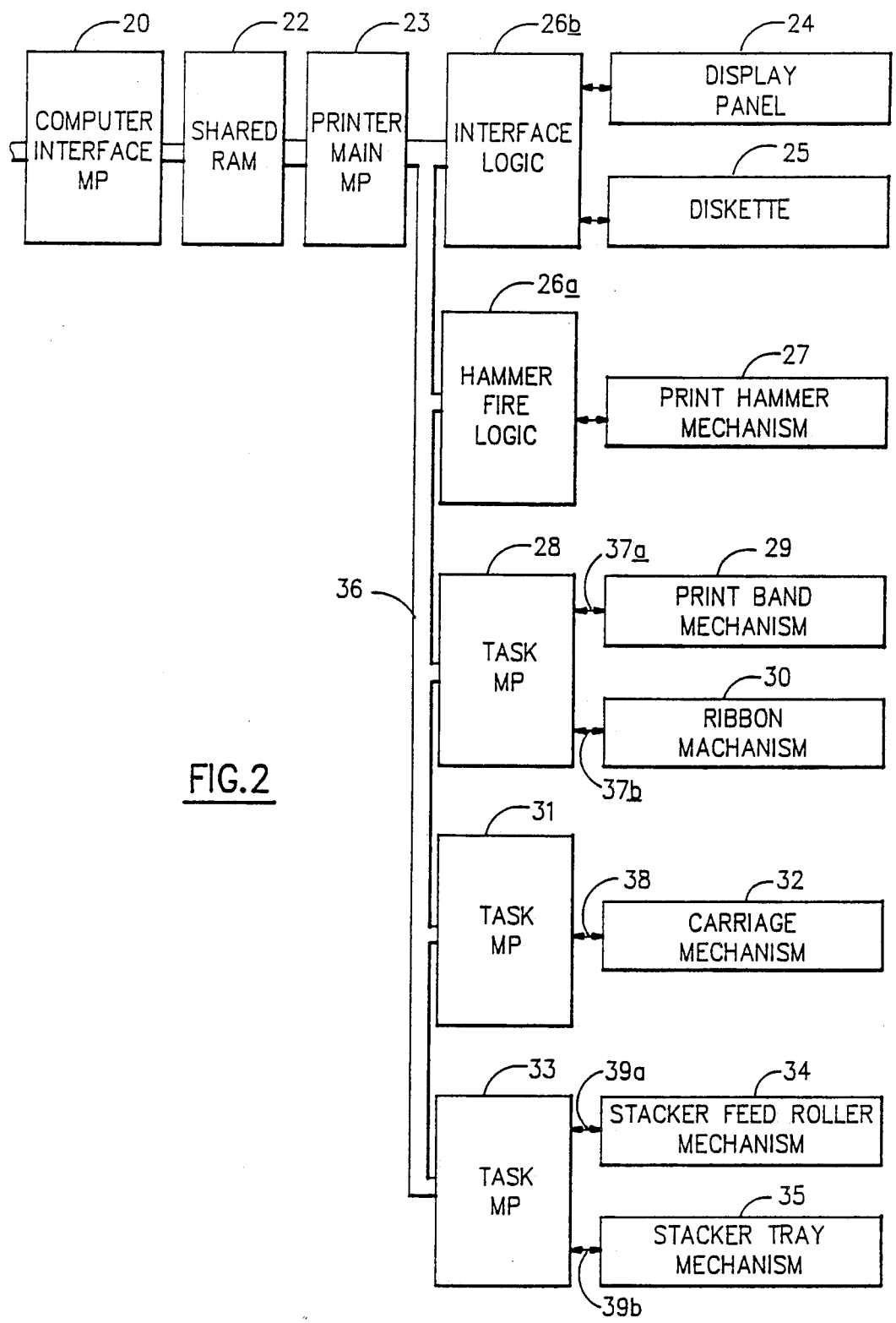
FIG. 2 is a block diagram illustrating in more detail the environment in which the present invention is adapted to function so effectively.

In FIG. 2, a computer interface microprocessor 20 receives data from a computer system (not shown) by means of a bus connection 21. Data from the microprocessor 20 is placed in a random access memory device 22, from which the data is available to the printer main microprocessor 23 where it is read and interpreted.

Based on such data, the printer main microprocessor 23 assigns various tasks to individual printer mechanism systems, such as for example, a display panel 24 (which is comparable to the display panel 19 in FIG. 1), an error log on diskette 25, print hammer logic 26a and fire mechanism 27, a print band mechanism 29 (through an associated microprocessor 28), a print carriage mechanism 32 (including its control microprocessor 31) and a task microprocessor 33 controlling a paper stacker feed roller mechanism 34 and a stacker tray mechanism 35.

The stacker feed roller mechanism 34, in FIG. 2, consists of the motor drive 11, the direct current motor 12, the feed roll unit 13 and the motion feedback sensor 14, as shown in FIG. 1.

The printer main microprocessor 23 monitors the respective printer mechanisms for status, resolves conflicts relating to communications on a main bus 36, performs error logging on the diskette 25 and provides data indicating status to the computer interface microprocessor 20. Each of the printer mechanism control systems manages the unique, real time control of its mechanical function.

Tasks are received from the printer main microprocessor 23, interpreted and executed at the correct time by the individual task microprocessors 28, 31 and 33. In addition to functional control, each task microprocessor 28, 31 and 33 provides online error detection and fault diagnosis (isolation) via real time state checking of various sense points (or hooks, or signals) in the controlled mechanism, via real time continuous performance monitoring (or velocity checking), or via both. This is done over bus connections 37a, 37b, 38, 39a and 39b, FIG. 2.

When an error condition is detected, a fault diagnosis subroutine is performed and a shutdown procedure is initiated on the failing mechanism. At this point, an error status is reported to the printer main microprocessor 23 over the communications bus 36. The printer main microprocessor 23 manages the shutdown of the other mechanisms if that is necessary, reports the status to the computer interface microprocessor 20, displays a status message on the display panel 24 through the interface logic 26b and creates an entry through the interface logic 26b in the printer internal error log, which is on the diskette 25.

Figure 3:
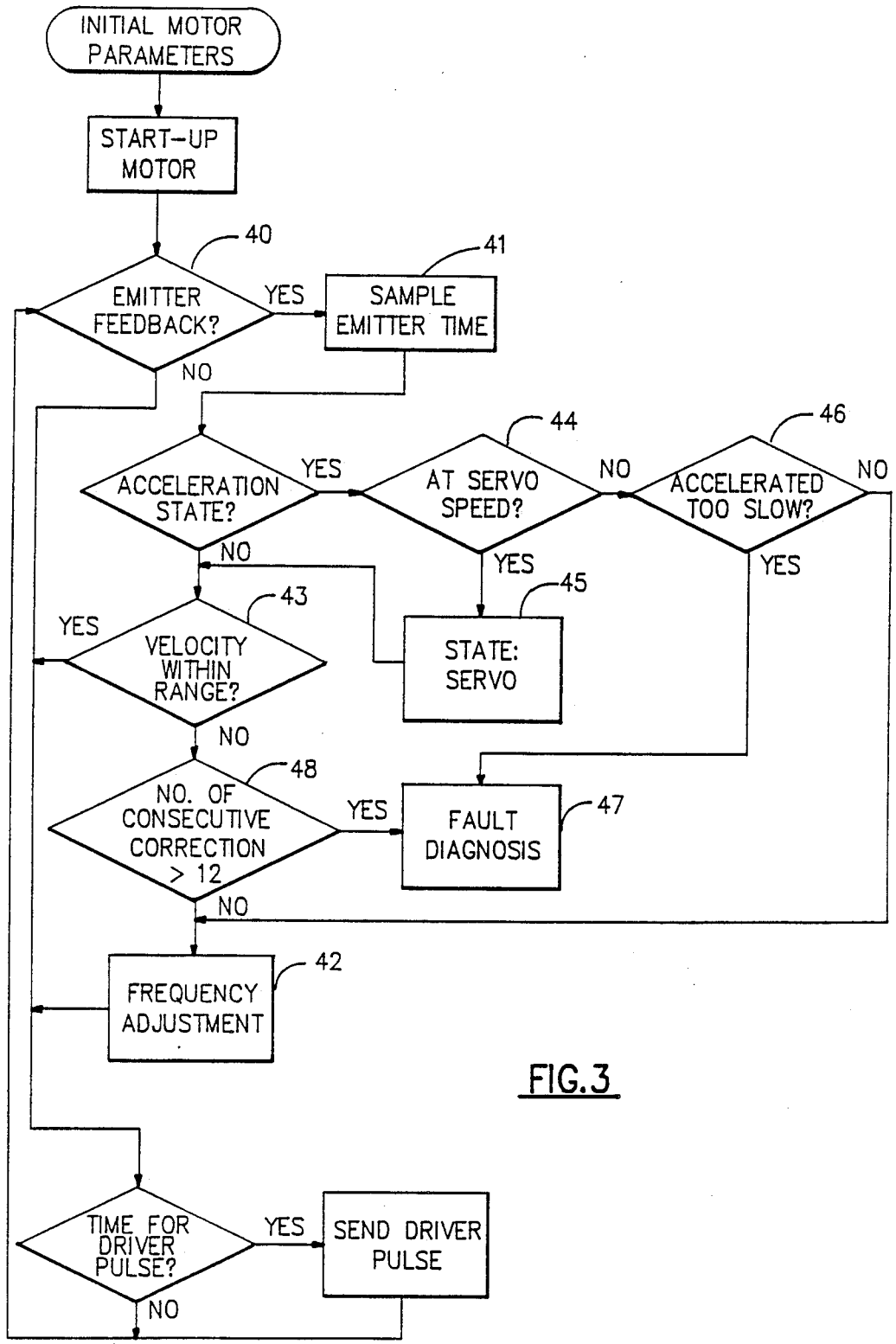
FIG. 3 is a flow chart indicating the control and monitoring routine performed by the microprocessor that is connected as shown in FIG. 1.

FIG. 3 of the drawings shows that the feed roller control system is a closed loop, frequency modulated drive for the direct current motor 12 (FIG. 1). The microprocessor 10 (FIG. 1) monitors feed roller velocity (note, in FIG. 3, blocks 40 and 41) by means of the feedback connection 15 which, for the particular use being described, is two feedback pulses for each revolution of the feed rollers, and the microprocessor 10 modulates the drive signal frequency (note block 42) as any adjustment appears to be necessary, which is based on any deviation in feed roller velocity from a preset velocity or velocity range (note block 43).

On motor start-up, a microcode controls the acceleration, which is in the control storage of the microprocessor 10. However, in accordance with the invention, this motor start-up is checked by the microprocessor 10, through the means of the feedback connection 15, to ensure that the feed rollers accelerate from rest to servo velocity (note blocks 44 and 45) within a preset period of time (note block 46).

Figure 4A:
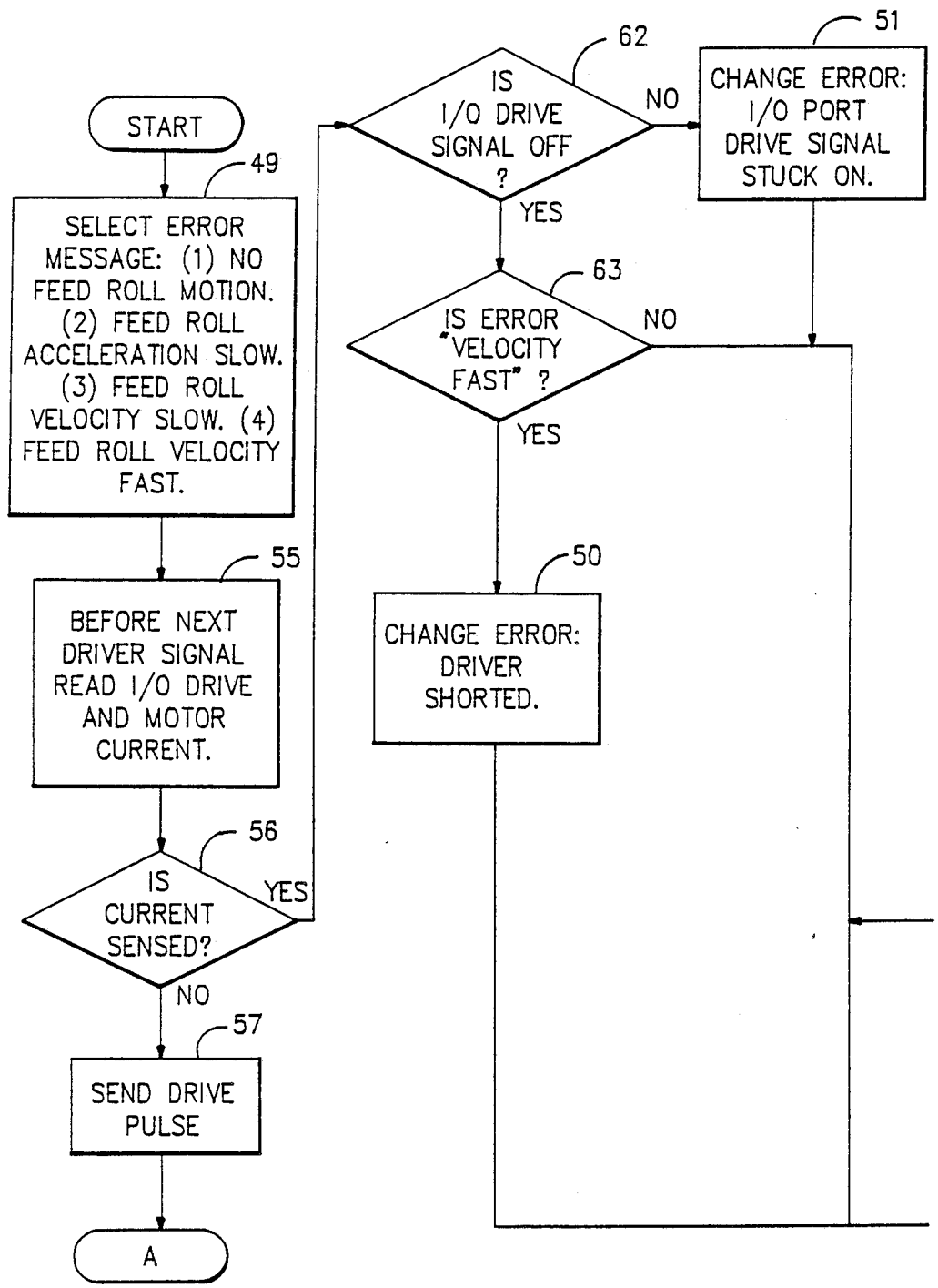
FIG. 4 is a flow chart indicating the fault diagnosis subroutine performed in real time while the equipment is online.
Figure 4B:
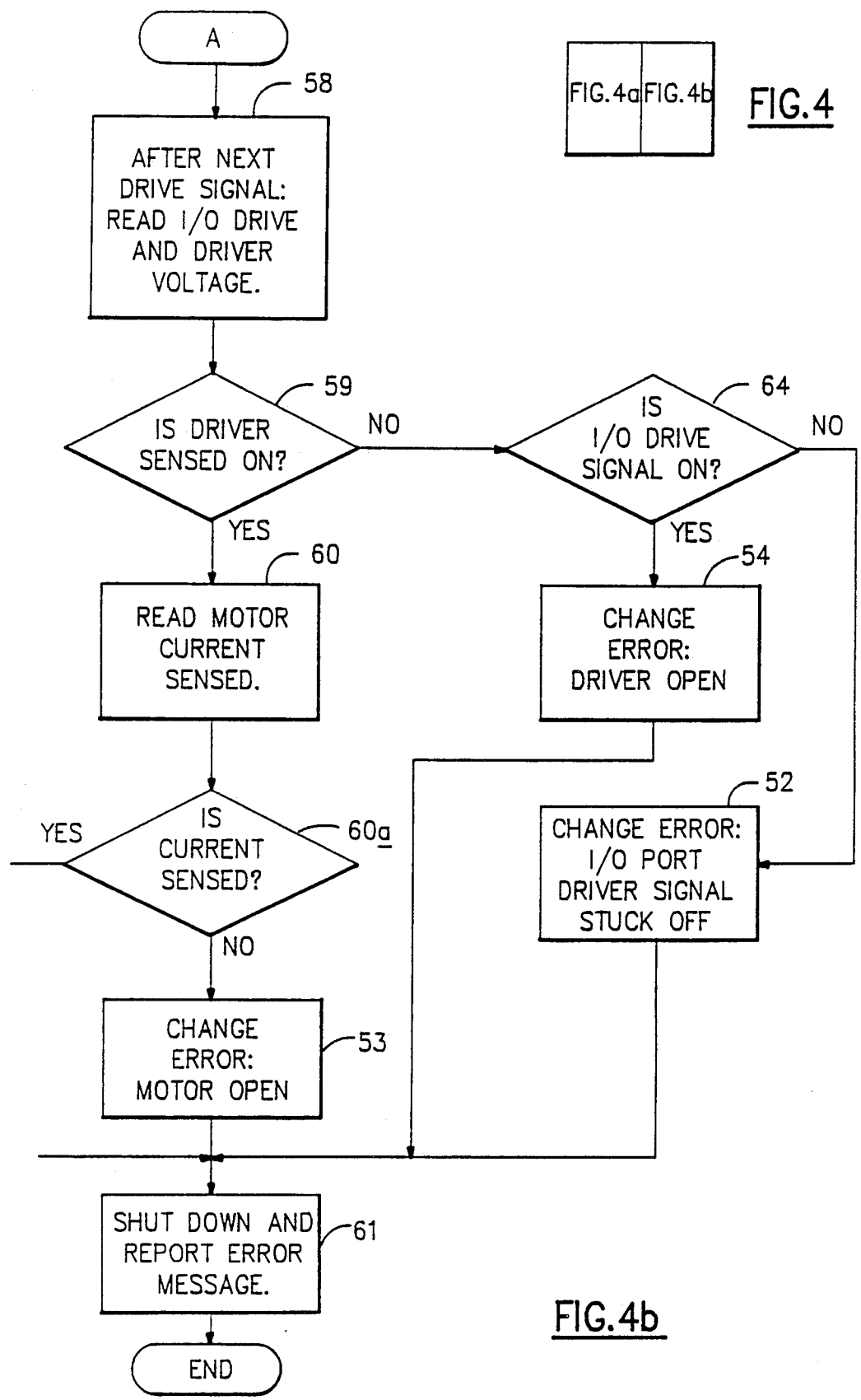

Nominal acceleration time for unloaded (or zero drag force) feed rollers can be 12 milliseconds. Should the feed rollers fail to reach the preset minimum velocity within the preset period of time, an error (or fault) is said to exist (note block 47), and the fault diagnosis subroutine of FIG. 4 is initiated.

Before describing the fault diagnosis subroutine, it should be pointed out that other conditions can be identified and preset, with preset range amounts, in order to initiate the fault diagnosis subroutine if they are deviated from for a preselected number of corrections. For example, after the feed rollers reach a preset servo velocity, the motor drive microcode, from the microprocessor 10, FIG. 1, begins controlling the steady-state (or servo) velocity of the feed rollers.

By means of the microprocessor 10, the velocity of the feed rollers is checked to ensure that it remains within a preselected range, or window (note block 43). If the velocity of the feed rollers remains outside of a preselected range of permitted deviation for a predetermined number of correction drive pulses (note block 48), for example 12 pulses, then a fault is said to exist, and the fault diagnosis subroutine is entered (note block 47) in order to identify the fault further, as will be described in more detail presently.

Another condition that can be preset is whether the feed rollers are in a certain state, such as "idle" or "stopped". For example, if the feed rollers are supposed to be in an idle state, the feed rollers can be checked by means of the connection 15 for motion, which if motion is detected and such detected motion exceeds a predetermined number of permitted revolutions, an error condition exists, and the fault diagnosis subroutine is initiated. Actually, there are two ways to detect this error . . . 1) "speed" of motion (RPM) and 2) "distance" (number of revolutions).

Of course, motion feedback over the connection 15, FIG. 1, is monitored continuously, whether the equipment is running or stopped. For example, when the motor 12 is running, there must be a feedback signal on the connection 15, and when the motor 12 is stopped, no significant feedback should be occurring on the connection 15. When the equipment is started, it must accelerate to a predetermined velocity within a preset period of time, and also, when the equipment is running at its steady-state velocity, it must remain within a predetermined range of permitted deviations over a preset number of corrections.

Some of the errors in motor velocity are isolated by the microprocessor 10 analyzing the motor driver voltage and current sense signals on-the-fly. In this instance, a fault isolation subroutine is executed immediately.

In order to isolate a fault to a particular part or component, a fault diagnosis subroutine is initiated, as will now be described in conjunction with FIG. 4 of the drawings. The fault diagnosis is executed on-the-fly, that is, before stopping the feed rollers and terminating operations of the equipment.

In accordance with the particular equipment being described for illustrative purposes, the fault diagnosis subroutine is initiated whenever a fault (or error) is detected indicating (1) feed roller feedback pulses are not occurring, (2) feed roller acceleration is excessively slow, (3) feed roller motor velocity is too slow, or (4) feed roller motor velocity is too fast.

Upon initiation of the fault diagnosis subroutine, an error message is set up for one of the four error conditions identified above and in block 49, FIG. 4. On-the-fly fault diagnosis now is initiated, and if an interrogated signal does not correspond to a preselected "acceptable" condition, an error message is given to identify a specific part or component as being responsible for the fault. The specific part or component that is identified as responsible for the fault is shown in FIG. 4 as (1) a short circuited motor driver (note block 50), (2) motor drive signal stuck-at-faults (note blocks 51 and 52), (3) an open circuited motor (note block 53), and (4) an open circuit motor driver (note block 54).

Before the next motor drive signal is initiated, the input/output port register of the microprocessor 10 is read to determine the state of the motor drive signal from the microprocessor 10 and motor driver current sense signal from the connection 17, FIG. 1, (note block 55 in FIG. 4). If the current sense signal from the connection 17 indicates current is not flowing in the motor drive 11 and, therefore, in the direct current motor, FIG. 1, (note block 56 in FIG. 4), this indicates an acceptable condition and the fault diagnosis subroutine continues after the next motor drive signal is initiated (note block 57 in FIG. 4).

After the motor drive signal is initiated, the motor drive signal from the microprocessor 10 and the motor driver voltage sense signal on the connection 16 are read (note block 58). If the driver voltage sense signal indicates that the motor driver is conducting (note block 59), this is an acceptable condition, and the fault diagnosis continues by interrogating the motor driver current sense signal on the connection 17 (note block 60). If current is sensed, this indicates an acceptable condition, and the motor drive signal from the microprocessor 10, FIG. 1, the motor drive 11 and the direct current motor 12 are all verified as being "good" to the main microprocessor 18 for appropriate indication on the display panel 19.

Now, feed roller motion can be stopped by terminating the feed roller drive signal, and the initial error message is reported to the printer's main microprocessor 18, FIG. 1, and 23 in FIG. 2 (note block 61 in FIG. 4) over the communications bus 18a, FIG. 1, and 36, FIG. 2. The main microprocessor 18 controls operations to stop the printer by issuing shutdown signals over the communications bus 36 in FIG. 2 to the other task microprocessors 28, 31 and 33 in FIG. 2; it saves the error message through the interface logic 26b, FIG. 2, in the printer's internal log on the diskette 25, also in FIG. 2; and it displays an error status message through the interface logic 26b, FIG. 2, on the printer's alphanumeric operator display panel 19, FIG. 1, and 24 in FIG. 2.

On the other hand, if current is sensed in the motor driver 11 and in the direct current motor 12, FIG. 1, (back to block 56 in FIG. 4), and if the motor drive signal is "off" (note block 62), and if the initial error detected is servo "velocity fast" (note block 63), the error message is changed to indicate a short circuited motor driver (note block 50). Otherwise, the initial error message is unchanged.

If current is sensed (at block 56) and if the motor drive signal is not "off" (at block 62), the error message is changed to indicate a microprocessor I/O port register drive signal bit stuck-at-fault (note block 51).

If, after the drive signal is initiated (note block 58), the driver voltage sense indicates that the driver is not conducting (note block 59) and the motor drive signal is "on" (block 64), the error message is changed to indicate an open circuited motor driver (block 54).

If the motor drive signal is "off" (block 64), the error message is changed to indicate a microprocessor I/O port register drive signal bit stuck-at-fault (block 52).

Operations Summary

Due to the complicated nature of the above described detailed procedure, the following abbreviated summary of some of the more significant steps in the technique of the invention may be helpful:

During Start-up: At the time of start-up of the feed rollers, the rotational velocity of the rollers is checked to ensure that the rollers accelerate from rest to the preset servo velocity within a preset period of time. If the servo velocity is not attainable, a fault diagnosis subroutine is initiated.

During Operation: After the feed rollers reach their preset velocity, their velocity is checked to ensure that the velocity remains within a preselected range of velocity deviation. If a velocity deviation remains outside of the range of acceptable deviation for a preset number of correction drive pulses, a fault diagnosis subroutine is initiated.

When Stopped: When the feed rollers are in a "stop" state, they are checked to ensure that no significant motion is detected. If motion exceeds a predetermined number of revolutions, or revolutions per minute, no additional fault diagnosis is necessary, and an error message is reported directly.

Advantages

The advantages of a technique in accordance with the invention include the following:

1. Feed roller control and mechanism faults are not permitted to result in paper jams, excessive misfolds and paper tears without reasons available for correction.

2. Once a fault is detected, operations continue for one more motor drive pulse. During that interval, motor current and motor driver sense signals are sampled and problems are diagnosed. By diagnosing faults in this manner:

(a) Improved fault isolation is achieved.
(b) The problem part or component is identified.
(c) Microprocessor utilization for the task of error detection is minimized, because only one signal is monitored continuously in real time for preselected error conditions.
(d) For the case of two or more control systems sharing a common microprocessor, the direct current motor driver voltage and current sense signals can be connected together in a "DOT-ORed" arrangement, provided that, at the time of sampling, these signals are inactive for all except the motor control system being diagnosed; that is all except the diagnosed motor control system must be in a "stopped" state.

Figure 5:
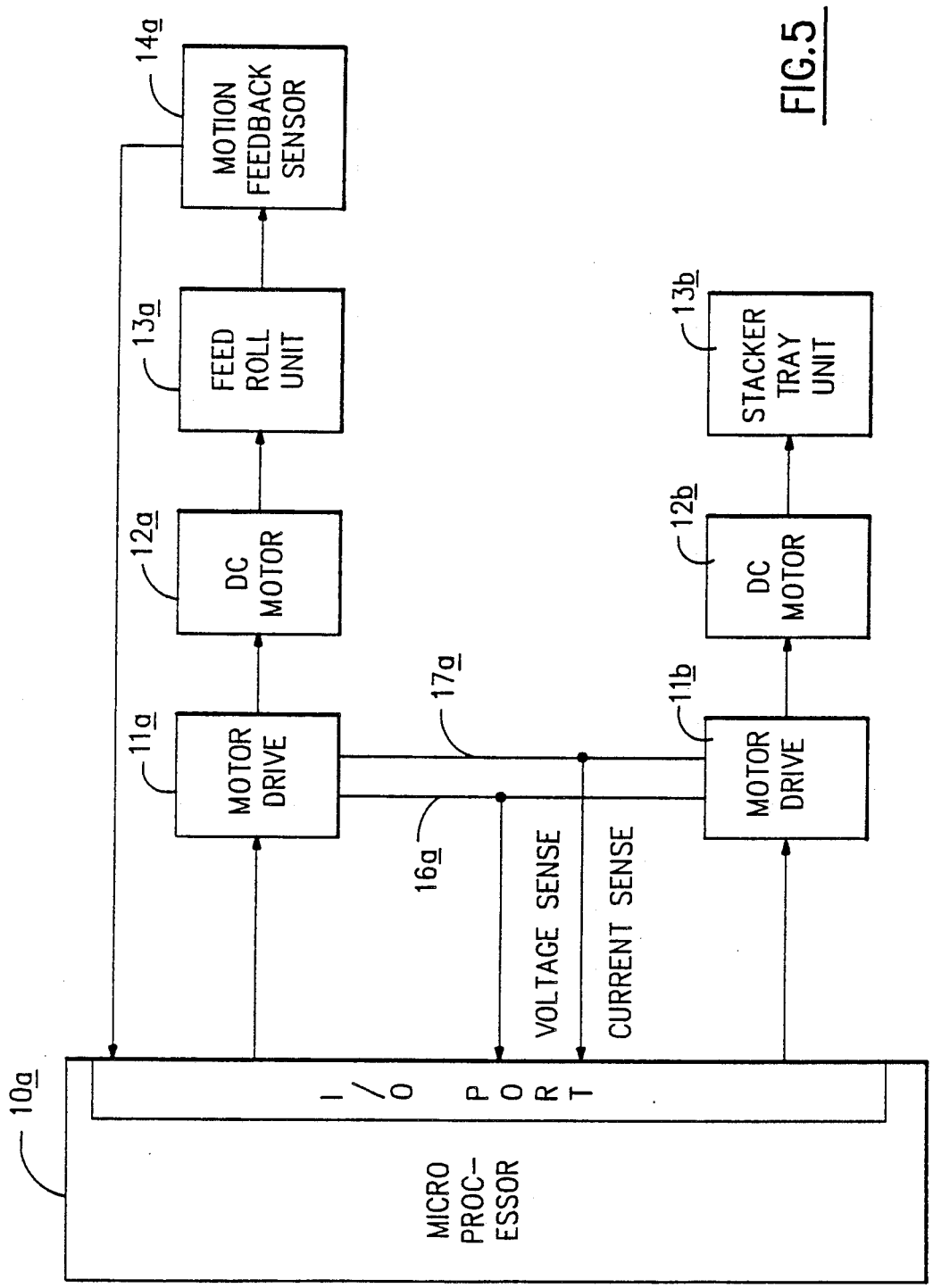
FIG. 5 is a block diagram illustrating respective mechanical parts connected for two or more control systems to share a common microprocessor.

This advantage is illustrated in FIG. 5 of the drawings.

Referring now to FIG. 5, this figure illustrates, partially, an arrangement such as shown in more detail in FIG. 1. Using similar reference numerals to identify the respective components in FIG. 5, a stacker feed roller control system includes a microprocessor 10a, 11a, 12a, 13a and 14a; voltage and current sense signal connections 16a and 17a. This stacker feed roller control system is "DOT-ORed" with a stacker tray control system which includes the components 10a, 11b, 12b and 13b as well as the voltage and current sense signal connections 16a and 17a.

This view in FIG. 5 shows that it is within the purview of the invention to control a plurality of systems a common microprocessor.

This can readily be the same mechanical equipment in FIG. 5 and can include the same or similar feedback connections, such as the feedback connection 15 that is illustrated in FIG. 1. Also, there can be, in the modification of FIG. 5, a main microprocessor 18 and a common display panel 19, like those in FIG. 1.

FIG. 5 shows a single microprocessor 10a connected as a control system for the motor drive 11a and also as a control system for the motor drive 11b. There is illustrated, in addition, a direct current motor 12a and a direct current motor 12b. However, FIG. 5 illustrates common voltage and current feedback connections 16a and 17a which can be used with an arrangement in accordance with the present invention.

Figure 7:
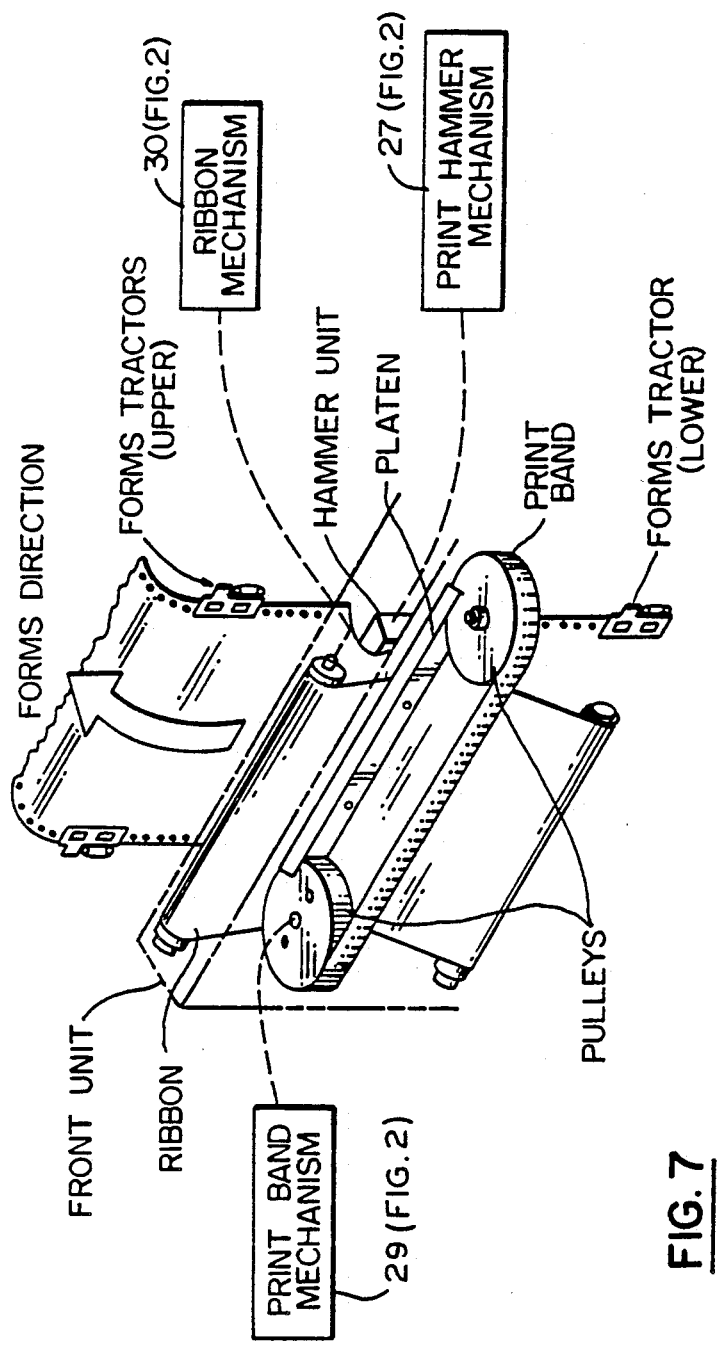
FIG. 7 is a perspective view of part of a line type of impact printer, for use as an aid in describing the present invention.
Figure 6:
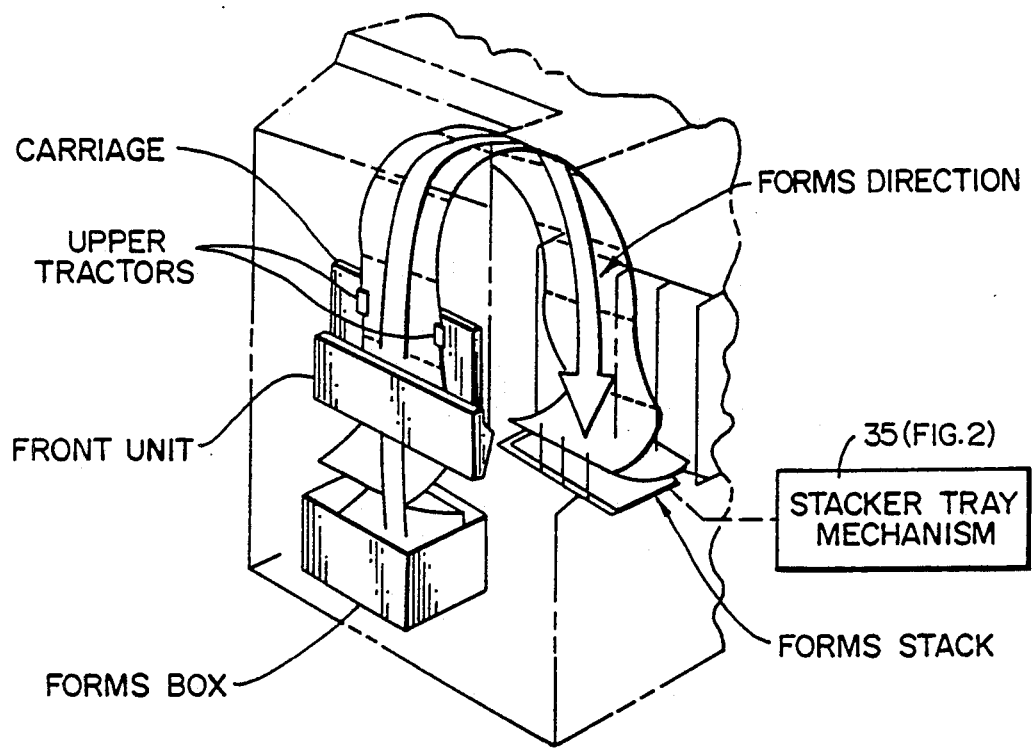
FIG. 6 is a diagrammatic view in perspective illustrating a forms stacker as used in one embodiment of the present invention.
Figure 8:
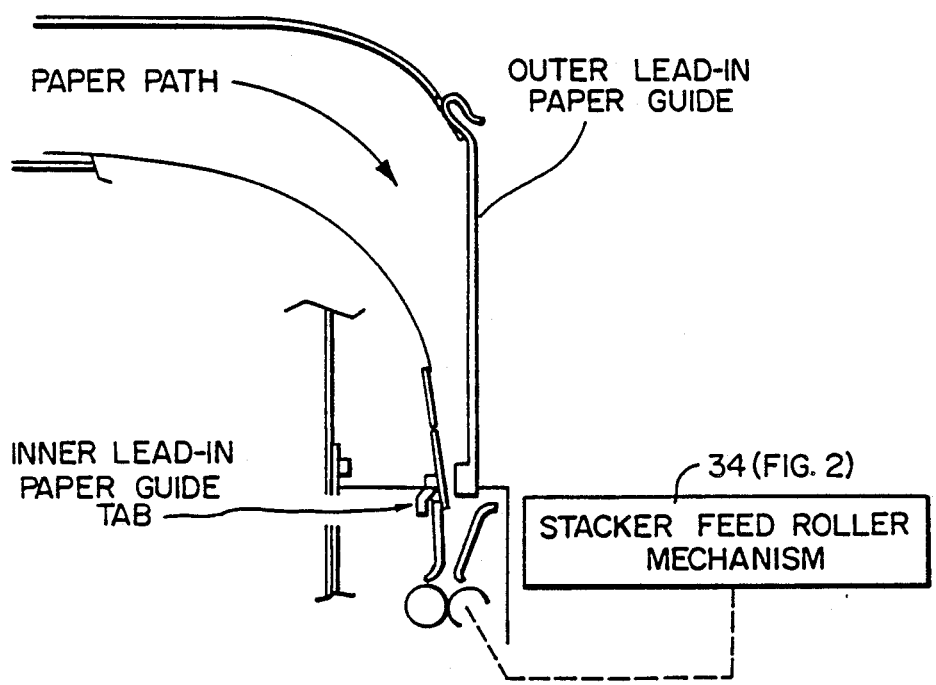
FIG. 8 is a side view of the operative part of a paper feed guide, as an aid in describing the environment that one form of the invention is adapted for use.

FIG. 6 of the drawings illustrates diagrammatically a power forms stacker with which the invention is adapted to function effectively, and FIG. 7 illustrates the operative components of an impact line printer. FIG. 8 shows a forms stacker device with which the invention functions also. Legends on these figures identify the various parts.

Fault Isolation Pseudo Code For Online Fault Diagnosis

An assumption is that prior to entering this procedure, either (A) or (B) has occurred.

(A) During acceleration, either (1) no feedback pulses have occurred, or (2) feedback pulses are occurring, but servo motor velocity has not reached within a specified period of time.

(B) During operations, the feed roller velocity was outside the specified range for acceptable conditions.

Therefore, the following fault diagnosis procedure, shown also in FIG. 4, is initiated online in real time:

Fault Isolation Pseudo Code

For Online Fault Diagnosis

An assumption is that prior to entering this procedure, either (A) or (B) has occurred.

(A) During acceleration, either 1) no feedback pulses have occurred, or 2) feedback pulses are occurring, but servo motor velocity has not reached within a specified period of time.

(B) During operations, the feed roller velocity was outside the specified range for acceptable conditions.

Therefore, the following fault diagnosis procedure, shown also in FIG. 4, is initiated online in real time:

PROCEDURE;

IF no feedback signal was received during acceleration, THEN

Error Status = no feed roller motion detected.
        Go to DRIVER_TEST (block 49, Item 1, FIG. 4)

END IF;

IF a feedback signal was received, but servo velocity was not achieved, THEN

Error Status = feed roller acceleration slow.
        Go to DRIVER_TEST (block 49, Item 2, FIG. 4).

END IF;

IF velocity was outside acceptable range & fast,
THEN

Error Status = feed roller velocity fast.
Go to DRIVER_TEST (block 49, Item 4, FIG. 4).

END IF;

IF velocity was outside acceptable range & slow,
THEN

Error Status = feed roller velocity slow.
Go to DRIVER_TEST (block 49, Item 3, FIG. 4).

END IF;

DRIVER_TEST:

DO;

Read the feed roller current sense signal.
(block 55, FIG. 4)

IF current is flowing (block 56, FIG. 4),
THEN

Read the feed roller I/O drive signal
port bit (block 55, FIG. 4).

IF feed roller run bit = on (block 62, FIG. 4), THEN

Change error status = I/O port failure.

Failure mode = I/O register bit stuck on.

(block 51, FIG. 4)

Go to DIAGNOSIS_DONE (block 61, FIG. 4)

END IF;

IF error is not velocity fast (block 63), THEN

Go to DIAGNOSIS_DONE (block 61)

ELSE;

Change error status = Feed roller driver failure.

Failure mode = shorted or low resistance driver.

(block 50)

Go to DIAGNOSIS_DONE (block 61)

```
        END IF;

END IF;

DO;

Send Drive Pulse (block 57, FIG. 4).

After next drive pulse, read feed roller driver
    voltage sense (block 58, FIG. 4).

IF driver not on (block 59),
    THEN
        Read I/O drive signal port bit (block 58).

If feed roller run bit = OFF (block 64),
        THEN

Change error status = I/O port failure.
                    Failure mode = I/O
                    register bit stuck off.
                    (block 52, FIG. 4)

Go to DIAGNOSIS_DONE (block 61, FIG. 4)

END IF;

ELSE;
```

Change ERROR status = Feed roller driver failure.

Failure mode = open or high resistance driver.

(block 54)

Go to DIAGNOSIS_DONE

END IF;

END DO;

Read feed roller current sense (block 60, FIG. 4).

IF current not flowing (block 60a, FIG. 4),
THEN

Change ERROR status = Feed roller motor or driver failure.

Failure mode = open motor or
                driver card connector.

(block 53)

Go to DIAGNOSIS_DONE

END IF;

END DO;

DIAGNOSIS_DONE:

DO;

Shut Down Feed Rollers (block 61, FIG. 4).

Report Error Status (block 61).

END DO;

END PROCEDURE;

The invention has been shown, described and illustrated in substantial detail with reference to a presently preferred embodiment thereof and a modification of that embodiment. It will be understood by those skilled in this art that various changes and further modifications may be made without departing from the spirit and scope of the invention which is set forth in the claims appended hereto.

What is claimed is:

1. In combination with a printer apparatus of the type used as output equipment with computer devices, at least one part of said printer apparatus having a direct current motor for causing a preselected function to be performed, a control system for said motor, comprising:
   microprocessor means connected with said direct current motor for monitoring the performance of said preselected function and for generating a predetermined signal when said performance deviates from a pre-established condition of operation;
   fault diagnosis means responsive to said predetermined signal to identify in real time a part causing said performance deviation while operation of said printer apparatus is continuing; and
   display means energized at least when a shutdown procedure is initiated for indicating the identity of said part causing said performance deviation.

2. The printer apparatus combination as defined in claim 1 wherein said means for monitoring the performance of said preselected function is in accordance with a predetermined routine in said microprocessor means, and said fault diagnosis means is in accordance with a predetermined subroutine in said microprocessor means.

3. The printer apparatus combination as defined in claim 1 including a plurality of direct current motors for causing a plurality of predetermined functions to be performed, and each of said plurality of functions being monitored by said microprocessor means.

4. The printer apparatus combination as defined in claim 1 including feedback connection means from said function to said microprocessor means.

5. The printer apparatus combination as defined in claim 1 including a plurality of feedback connection means to said microprocessor means for providing signals indicative of predetermined conditions of operation.

6. In a control system for controlling direct current motor drivers of at least one mechanical component adapted for functional connection in combination with a computer line type printer system, a method for monitoring in real time preselected conditions in said mechanical component and to perform real time diagnosis of a fault condition, comprising the steps of:
   selecting at least a condition of operation corresponding to acceptable component functioning;
   monitoring said condition during the operation of said component;
   initiating a fault diagnosis subroutine in real time, while said component operation is continuing, when a monitored condition deviates from said acceptable component functioning; and
   establishing an error message to indicate the identified condition while said component is operating.

7. The method as defined by claim 6 including the step of adjusting a condition detected as being unacceptable to attempt to bring said unacceptable condition within a predetermined range of acceptable deviation.

8. The method as defined by claim 7 including the steps of checking said condition again after said step of adjusting, and initiating said fault diagnosis subroutine only when said condition remains unacceptable.

9. The method as defined by claim 8 including the steps of establishing a range of acceptable deviations for said selected condition, and said step of monitoring includes monitoring said range of acceptable deviations.

10. The method as defined by claim 9 including the step of initiating said fault diagnosis subroutine only when an unacceptable condition is detected as remaining outside said range.

* * * * *